United States Patent [19]

Lindstrum et al.

[11] 4,187,491

[45] Feb. 5, 1980

[54] DOPPLER COMPENSATED PSK SIGNAL PROCESSOR

[75] Inventors: Alan L. Lindstrum, Bainbridge Island; Jay V. Chase, Poulsbo, both of Wash.

[73] Assignee: The United States of America as represented by the Secretary of the Navy, Washington, D.C.

[21] Appl. No.: 931,691

[22] Filed: Aug. 7, 1978

[51] Int. Cl.² .............................................. G01S 5/18
[52] U.S. Cl. .............................. 367/125; 343/112 D; 325/65; 325/346
[58] Field of Search ............... 343/112 D; 325/42, 65, 325/346; 340/3 D, 6 R

[56] References Cited

U.S. PATENT DOCUMENTS

| | | | |
|---|---|---|---|
| 3,205,475 | 9/1965 | Foss | 340/6 R |
| 4,007,330 | 2/1977 | Winters | 325/65 X |
| 4,131,873 | 12/1978 | Anderson | 340/6 R |

Primary Examiner—Richard A. Farley
Attorney, Agent, or Firm—R. S. Sciascia; Charles D. B. Curry; Francis I. Gray

[57] ABSTRACT

A Doppler compensated PSK signal processor which receives a plurality of messages from a sensor array and decodes each message for further data processing. The signal processor compensates for the Doppler shift in the message frequency due to the velocity differential between the transmitting vehicle and the sensor array. The message is decoded for a valid identification code from which is derived a time mark related to a specified system time to provide range and direction information for the identified transmitting vehicle. The telemetry data in the message and the time mark are output to a data processing system on an interrupt basis to provide tracking and data analysis for the transmitting vehicle.

17 Claims, 12 Drawing Figures

FIG_1

FIG_2a

FIG_2c

FIG_2d

FIG-2e

FIG_2f

FIG_3

FIG_4

FIG_5a

DATA MESSAGE

| ACQ TONE | ID CODE | STATUS | TELEMETRY |
|---|---|---|---|
| 0 1 | | 19 20    23 24 | 47 |

MICROPROCESSOR WORD IN 8-BIT BYTES

| BYTE | 7 | 6 | 5 | 4 | 3 | 2 | 1 | 0 |
|---|---|---|---|---|---|---|---|---|
| 0 | INTERRUPT FLAG | INITIALIZED | FAULT | SP | SP | SP | S/N A | S/N B |
| 1 | CALIB | MSB | ←——— CONTINUOUS ——— | | TIME (UPPER 7) | | | |
| 2 | | | TIME (MIDDLE 8) | | | | | |
| 3 | | | TIME (LOWER 8) | | | | | LSB |
| 4 | MSB | | TELEMETRY | | | | | |
| 5 | | | TELEMETRY | | | | | |
| 6 | | | TELEMETRY | | | | | LSB |
| 7 | ID 8 | ID 4 | ID 2 | ID 1 | IR | FRAME A | FRAME B | FRAME C |

FIG_5b

| LAMP A | LAMP B | LAMP C | LAMP D | THRESHOLD CONTROL | THRESHOLD CONTROL | THRESHOLD CONTROL | THRESHOLD CONTROL |
|---|---|---|---|---|---|---|---|
| SPARE | CROSSTALK TEST | VCO SETUP | VCO TEST | CALIBRATE | WINDOW LOCKOUT | TELEMETRY LENGTH | INHIBIT |

←——— CODES 2,7 ———→  ←——— CODES 1, 3-6, 8-12 ———→

CONTROL WORD FORMATS

FIG_5c

DOPPLER COMPENSATED PSK SIGNAL PROCESSOR

BACKGROUND OF THE INVENTION

1. Field of the Invention

The present invention relates to signal processing, and more particularly to a Doppler compensated signal processor for processing acoustic PSK messages.

2. Description of the Prior Art

Prior underwater test ranges used vehicles which transmitted a tone burst signal to provide location information and which did not transmit telemetry data. A high signal-to-noise ratio signal was required in order to detect a threshold level on the envelope of the tone burst signal to provide a time mark for determining range and direction information for tracking, and the time mark would not be generated at the same point of the envelope from signal to signal resulting in tracking errors. Also, since all vehicles generated the same tone burst signal, it was not possible to differentiate between multiple vehicles.

To provide more accurate tracking data and to provide vehicle identification, status and telemetry data, a PSK synthesizer was developed (see co-pending application Ser. No. 900,211 by Alan L. Lindstrum entitled "A PSK Pulse Synthesizer" filed Apr. 26, 1978) to convert the vehicle acoustic transmitter from a tone burst generator to a PSK message generator to provide vehicle identification, status and telemetry data. Since any change in the frequency of the PSK message due to Doppler shifts will introduce an error in the tracking data, a Doppler compensated PKS signal processor was required.

SUMMARY OF THE INVENTION

Accordingly, the present invention provides a Doppler compensated PSK signal processor which compensates for any Doppler shift in the transmitted PSK message frequency, detects a valid identification code, decodes the PSK message and generates a timing mark for tracking the transmitting vehicle. A plurality of PSK messages from an acoustic sensor array are demultiplexed with the signal levels adjusted to normalized values. Each sensor message is processed similarly in parallel. The message goes through a frequency tracking loop so that the signal processor clock is in frequency synchronization with the message frequency regardless of any Doppler shift. The identification bits are detected and validated. The validation of the ID code generates a timing mark which transfers a time to the output, the time being measured from a range time benchmark with which the transmitting vehicle is synchronized. The telemetry data portion of the message is also transferred to the output. A microprocessor acts as a data buffer for a data processor and transfers the data from the signal processor to the microprocessor on an interrupt basis after each message has been decoded.

Therefore, it is an object of the present invention to provide a Doppler compensated PSK signal processor for decoding acoustic PSK messages from a transmitting vehicle.

Another object of the present invention is to provide a Doppler compensated PSK signal processor for generating accurate tracking information at low signal-to-noise ratios.

Still another object of the present invention is to provide a Doppler compensated PSK signal processor for generating unique tracking information for multiple transmitting vehicles.

Other objects, advantages and novel features of the present invention will be apparent from the following specification when read in light of the appended claims and attached drawing.

BRIEF DESCRIPTION OF THE DRAWING

FIG. 2(a-f) is a schematic diagram of one channel of the Doppler compensated PSK signal processor.

FIG. 5 is a representation of (a) a typical data message word, (b) its counterpart computer word in the microprocessor, and (c) the microprocessor control word formats.

DESCRIPTION OF THE PREFERRED EMBODIMENT

Figure 1:
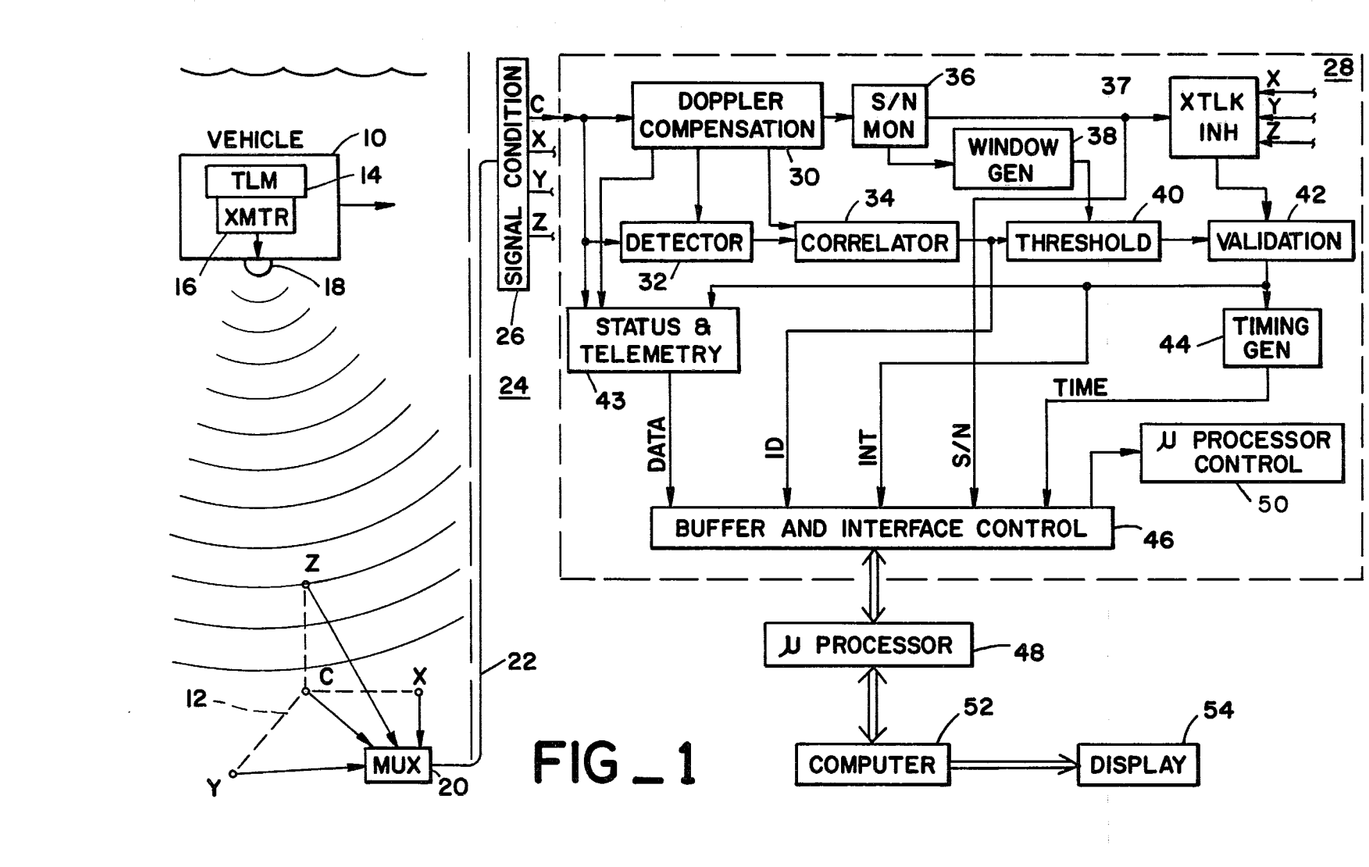
FIG. 1 is a block diagram of an underwater tracking system using a Doppler compensated PSK signal processor.

Referring now to FIG. 1 an underwater vehicle 10 is shown in motion relative to a fixed acoustic sensor array 12 having, for example, sensors x, y, z and c at the corners of a cube. A telemetry multiplexer 14 located in the vehicle 10 provides telemetry data to an acoustic transmitter 16. The acoustic transmitter 16 outputs a PSK message containing a unique identification code in an identity code portion, and status information and telemetry information in a status and telemetry portion to an acoustic emitter 18. The acoustic emitter 18 emits sound waves in the form of the PSK message from the transmitter 16. The acoustic PSK message is received by each sensor x, y, z and c of the acoustic sensor array 12 at different times depending upon the relationship of the vehicle 10 to the array.

The sensors x, y, z and c detect the acoustic signal and convert it to four electrical signals, each containing the same information but occurring at slightly different times as discussed above. From the time of reception at each sensor x, y, z and c the position of the vehicle can be computed based upon a system time pulse $I_o$ with which the acoustic transmitter is synchronized. A multiplexer 20, such as a frequency division multiplexer, mixes the four signals onto one cable 22 with appropriate pre-emphasis added for transmission to a processing center 24.

A signal conditioner 26 demultiplexes the signal from the cable 22, adjusts the four signal levels to their original values, normalizes the noise level and filters the signals before applying the signals to a Doppler compensated PSK signal processor 28. The Doppler compensated PSK signal processor 28 has an identical channel for each sensor signal, so only one will be described here as representative of all. The signal from the c sensor is input to a Doppler compensation circuit 30 which causes an internal oscillator to track the frequency of the input signal and generate timing signals. The Doppler compensation circuit 30 provides timing to a detector 32 and correlator 34 which detect the ID bits of the PSK message and compare them with a plurality of identification codes to determine a match and identify the matched code. A portion of the signal passes through the Doppler compensation circuit 30 to a signal and noise monitor 36 which determines the acoustic noise level to provide a fault indication if the noise level is too high or too low (receiver malfunction), and to regulate other circuits to be discussed infra depending on the signal-to-noise ratio. For instance if the signal-to-noise ratio is very strong on one channel and weak on the other channels the output is inhibited by a cross-talk prevention circuit 37, or for strong signal-to-noise ratios the correlation threshold may be reduced by a window generator 38 which reduces the correlation threshold of a threshold circuit 40 during a preset window time when correlation should occur. When the correlation of the ID bits with the ID codes exceeds the threshold established by the threshold circuit 40, a pulse is output to a validation circuit 42 which generates a timing mark if the pulse meets validity criteria. A timing generator 44, initiated by the $I_0$ system bench mark, transfers the timing corresponding to the timing mark to a buffer and interface control unit 46. Also input to the buffer and interface control unit is the status and telemetry data from a status and telemetry circuitry 43, the ID code, a S/N indicator and an interrupt from the timing mark. A microprocessor 48 interrogates the interrupt and reads the information in the buffer and interface control unit 46 when the interrupt is set. The microprocessor 48 also sends commands to the signal processor 28 via the buffer and interface control unit 46. A microprocessor control circuit 50 routes the microprocessor commands to the various circuits of the signal processor 28. The data from the microprocessor 48, which includes all four channels, is subsequently transferred to a digital processor 52 which processes the data for real time and/or postoperation display of the vehicle 10 track and status on a suitable display device 54.

FIG. 2 shows the signal processor 28 in greater detail. The input signal (SIG IN) from the signal conditioner 26 is input via amplifier 56 and clipper 58 to a frequency multiplier 60 (FIG. 2a). SIG IN for illustrative purposes has a frequency of 75 kHz plus or minus the frequency change caused by Doppler shifting. A switch SW1 is provided to substitute a test signal (S.T.U. IN) for SIG IN for system analysis and calibration. The multiplier 60 acts as a frequency doubler, outputting a signal which is approximately 150 kHz. A signal mixer 62 mixes the 150 kHz signal with an external 133⅓ kHz signal input via buffer amplifier 64 to produce an output signal of approximately 16⅔ kHz. The purpose of mixing to obtain the 16⅔ kHz signal is two-fold. First, a Doppler phase shift is magnified nine times, i.e., a 2 percent or 1.5 kHz shift from 75 kHz becomes 3 kHz from 150 kHz, but also 3 Hz from 16⅔ kHz which is 18 percent. Secondly, it is possible to construct a simpler, more stable filter at 16⅔ kHz due to filter Q reduction by a factor of 9 relative to an equivalent filter at 150 kHz. A Doppler filter 66, such as a third-order Chebishev or Butterworth filter, filters the 16⅔ kHz signal and outputs the signal to an amplifier/clipper 68. The signal is further filtered and clipped by clipper 69 (FIG. 2b) to produce an essentially square wave signal at approximately 16⅔ kHz plus or minus 3 kHz. For a filter bandwidth of ±2% Doppler (6 kHz for this example) maximum rejection of sidebands is obtained without degradation performance with vehicles 10 traveling up to 60 knots.

Figure 2A:
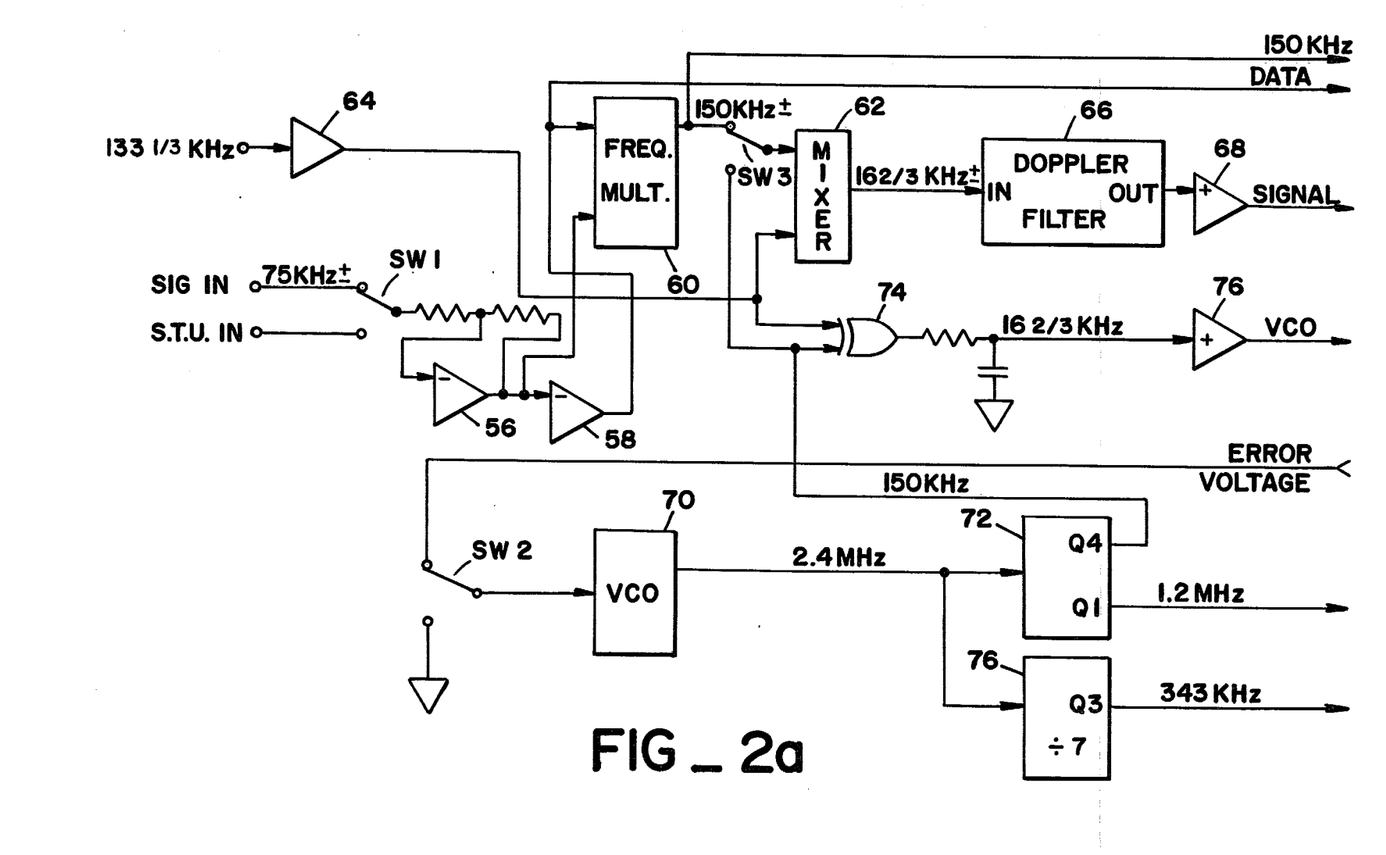
Figure 2B:
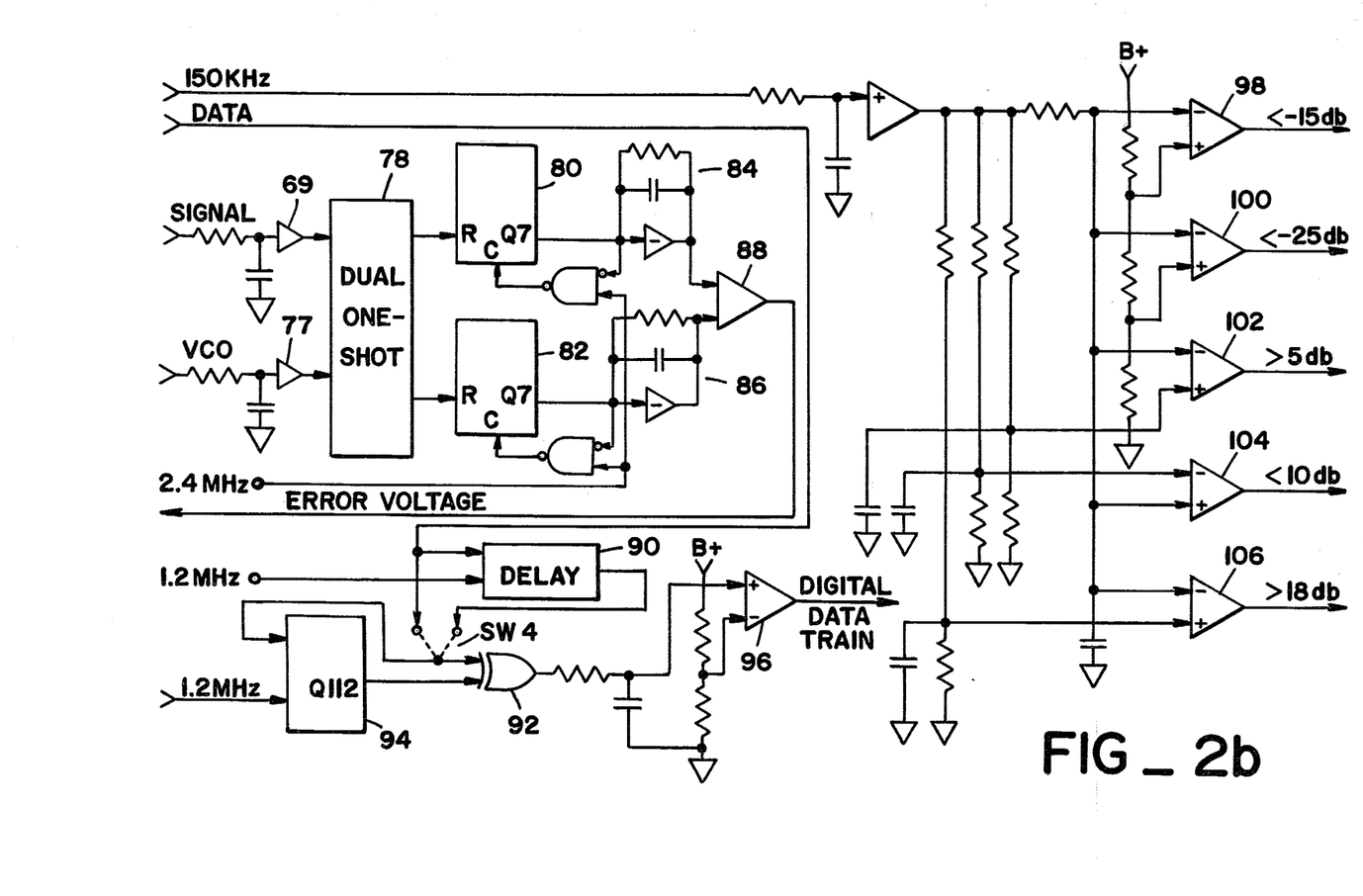

A voltage controlled oscillator (VCO) 70 (FIGS 2a), which norminally operates at 2.4 MHz for this illustration, provides a stable norminal frequency which is divided to produce the required Doppler compensated frequencies. A switch SW2 connects the VCO control to ground for a zero error signal to calibrate the VCO 70 center frequency, or to an error voltage which will be described shortly. A first counter 72 divides the VCO frequency by two and by sixteen to provide a 1.2 MHz signal and a 150 kHz signal. The VCO 150 kHz signal is applied to an exclusive OR gate 74 which acts as a mixer, with the 133⅓ kHz signal applied to the other input. The 16⅔ kHz output of the OR gate 74 is filtered by an RC network, and amplified and clipped by a VCO clipper 76, refiltered and clipped again by clipper 77 (FIG. 2b). The VCO 150 kHz signal is also input via a switch SW3 to the signal mixer 62 to calibrate the system. A divide-by-seven counter 76 (FIGS. 2a) provides a third VCO frequency at 343 kHz. The switches SW1, SW2 and SW3 are controlled by the microprocessor 48 via the microprocessor control circuit 50.

A dual one-shot circuit 78 (FIG. 2b) converts the signal 16⅔ kHz and VCO 16⅔ kHz into a series of narrow pulses. A 2.4 MHz external signal is input to a signal counter 80 and a VCO counter 82. The counters 80 and 82 count the 2.4 MHz clock pulses up to n at which point the output goes high, inhibiting further clock pulses input until the counters are reset by the output of the respective halves of the dual one-shot circuit 78. An amplifier/filter circuit 84,86 for each of the counters 80,82 converts the output of the counters to a d.c. voltage level proportional to the signal and VCO frequencies. A differential amplifier 88 compares the signal d.c. voltage level with the VCO d.c. voltage level and generates an error voltage to adjust the frequency of the VCO 70 to track the frequency of SIG IN. N is selected to be less than the minimum anticipated interval between respective one-shot pulses, the interval being a function of the Doppler phase shift.

DATA, which is nominally at 75 kHz for this illustration, is input to a delay circuit 90 to which an external 1.2 MHz clock is applied to shift DATA along the delay circuit. The purpose of the delay circuit 90 is to allow the Doppler compensation circuit 30 time to lock-on so the VCO 70 is tracking SIG IN. If there is an acquisition tone at the beginning of the data message, the delay circuit 90 is unnecessary and may be bypassed via a hardwired switch SW4. DATA is input to an exclusive OR gate 92 which acts as a phase comparator, and to a shift register 94 to which is applied the 1.2 MHz Doppler compensated frequency from the VCO counter 72. The shift register 94 delays DATA exactly one data bit so the second input to the phase comparator 92 is being compared with the next data bit. If the phase of a bit is the same as the phase of the preceeding bit, it is decoded as a binary "1". A 180° phase difference is decoded as a binary "0". Thus, the output of the phase comparator is a stream of "1"s and "0"s indicative of the phase shifts in DATA. The output is filtered by an RC filter. A comparator 96 compares the output of the RC filter which varies between 0 and B+ with B+/2 to provide a DIGITAL DATA TRAIN which is subsequently decoded.

The 150 kHz data signal is amplified and filtered to provide a detected envelope, and is input to a plurality of amplitude comparators 98,100,102,104 and 106. An RC network converts the 150 kHz data signal to d.c. voltage levels, with comparators 98 and 100 comparing the signal with fixed voltage levels for a noise level determination and comparators 102,104 and 106 comparing an appropriately attenuated signal with the average noise level for signal-to-noise determinations.

Figure 2C:
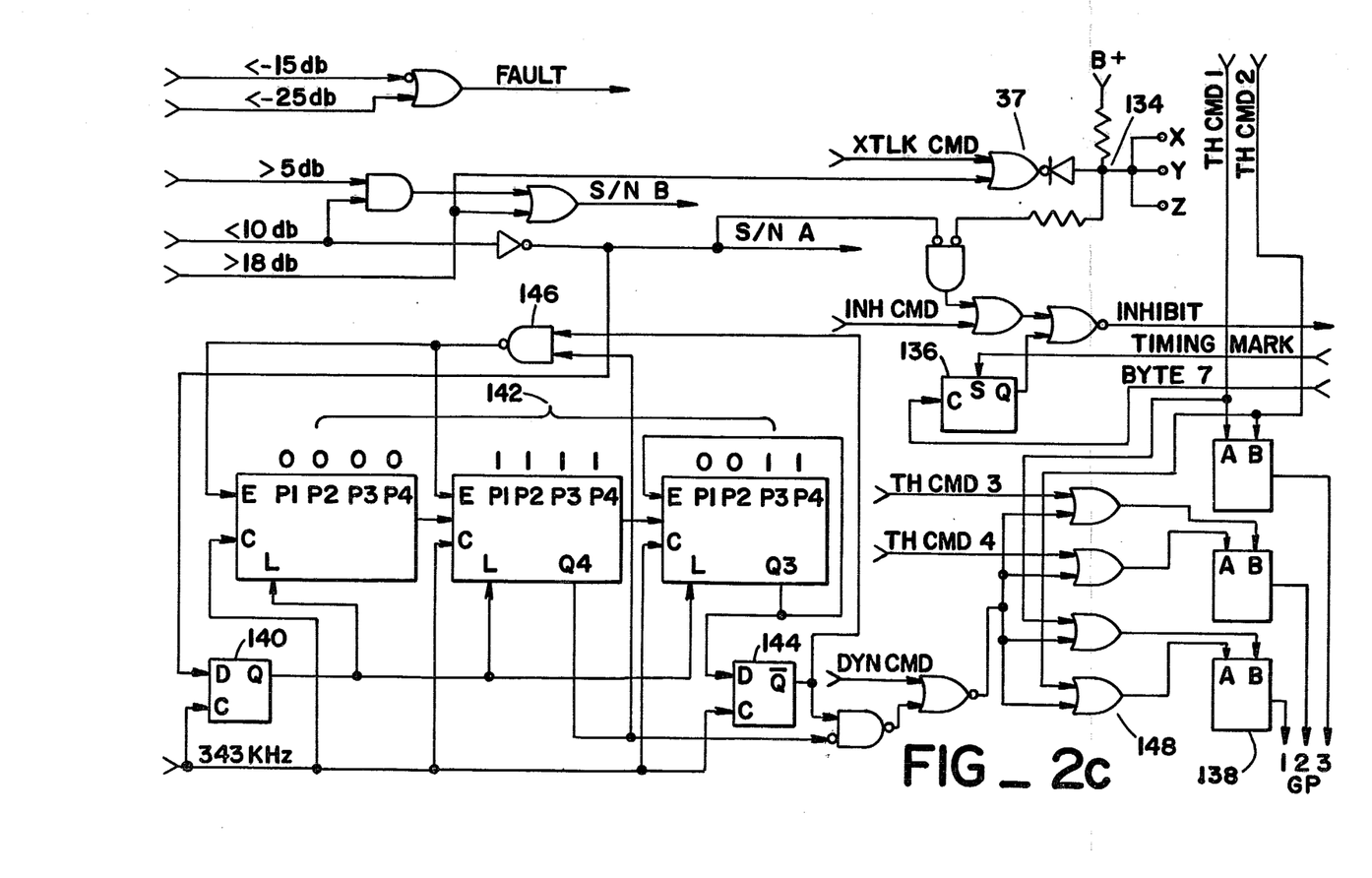
Figure 2D:
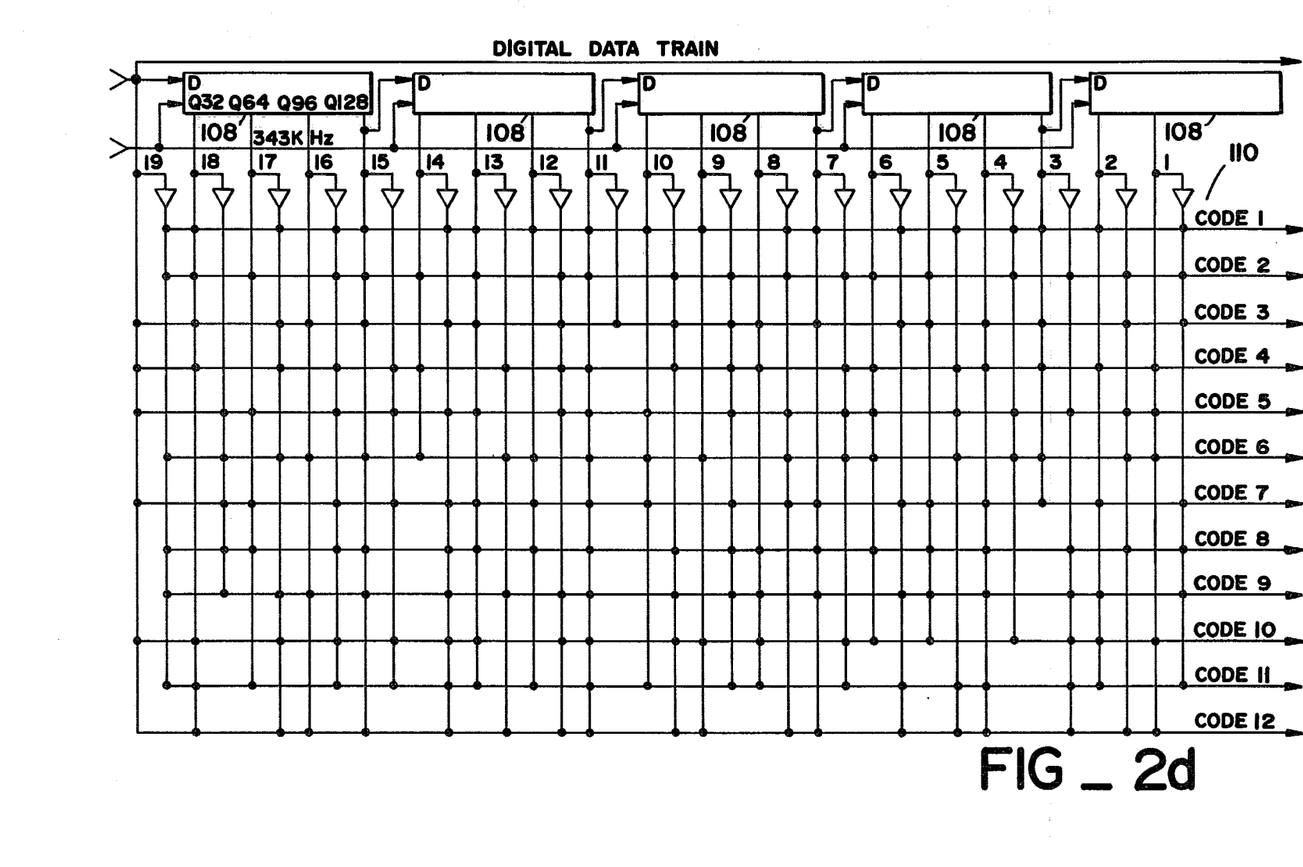

The DIGITAL DATA TRAIN is input to a correlator shift register 108 (FIG. 2d) to which is also applied the Doppler compensated 343 kHz VCO clock. A plurality of summing networks (resistors not shown) 110 sums the outputs of the correlator shift registers 108 together with the data bit at the input. For a data message having a 20-bit ID code, the first bit (reference and/or acquistion tone) is discarded and the remaining 19 bits are summed. If the 19 bits match one of the predetermined codes, 1–12 in this illustration, that code line will ideally attain the highest sum indicating all 19 bits correlate to the code. Comparisons with the codes are made 32 times per data bit by the 343 kHz VCO clock. The time resolution for this example is thus $$93.3/32 = 2.8 \text{ sec } (\pm 1.4 \text{ }\mu\text{sec}) \tag{1}$$

which is more than adequate for high-accuracy tracking. (Each data bit is seven cycles of 75 kHz from which the 93.3 μsec per data bit is derived.) The codes are designed to have low crosscorrelation with each other so that each summing network 110 responds to only one code.

A plurality of threshold comparators 112 (FIG. 2e) compare each code line with a threshold level equivalent to between 14 and 19 bits compared, the level determination being described in detail subsequently. Only one of the threshold comparators 112 will produce an output. A priority encoder 114 converts the output of the threshold comparators 112 into a four-bit binary code representative of which comparator, i.e., code, has exceeded its threshold. The priority encoder 114 also outputs a VALIDATION signal indicating a code has been detected.

Figure 2E:
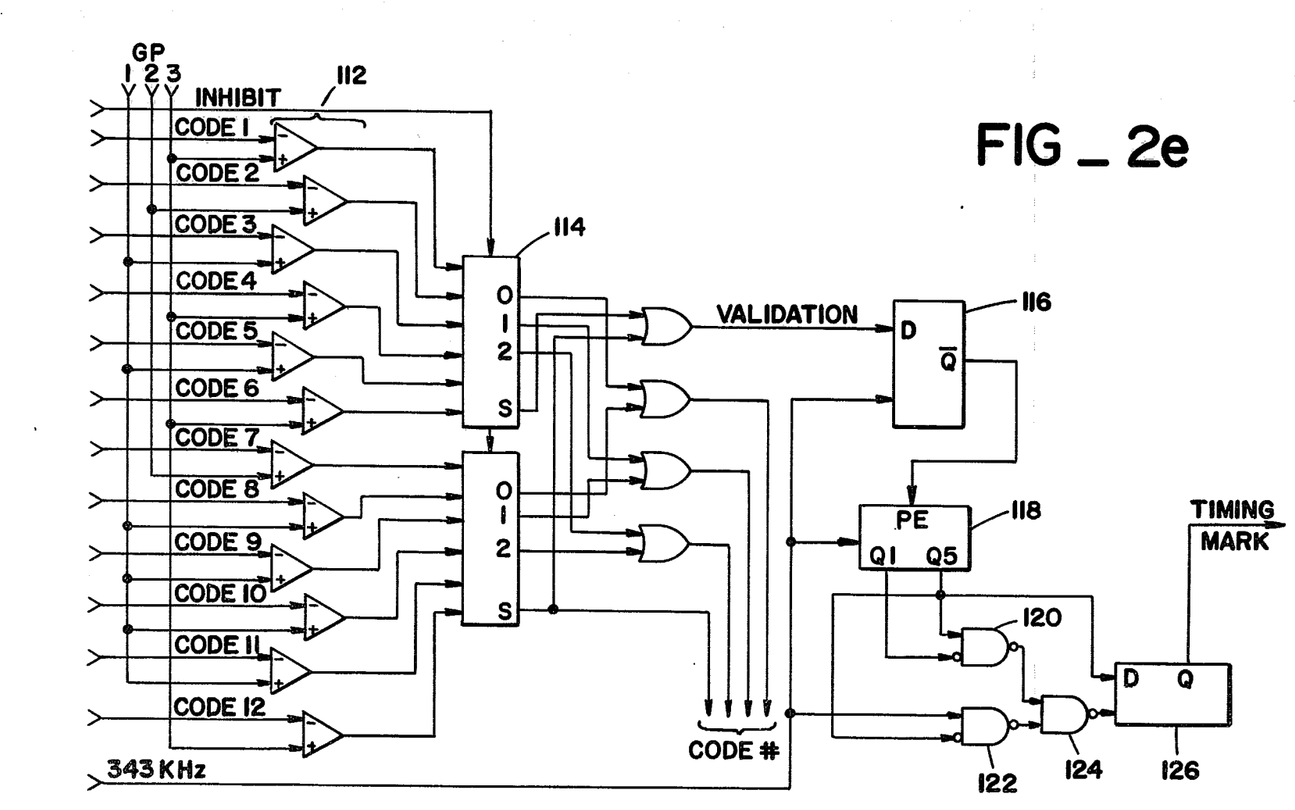
Figure 3:
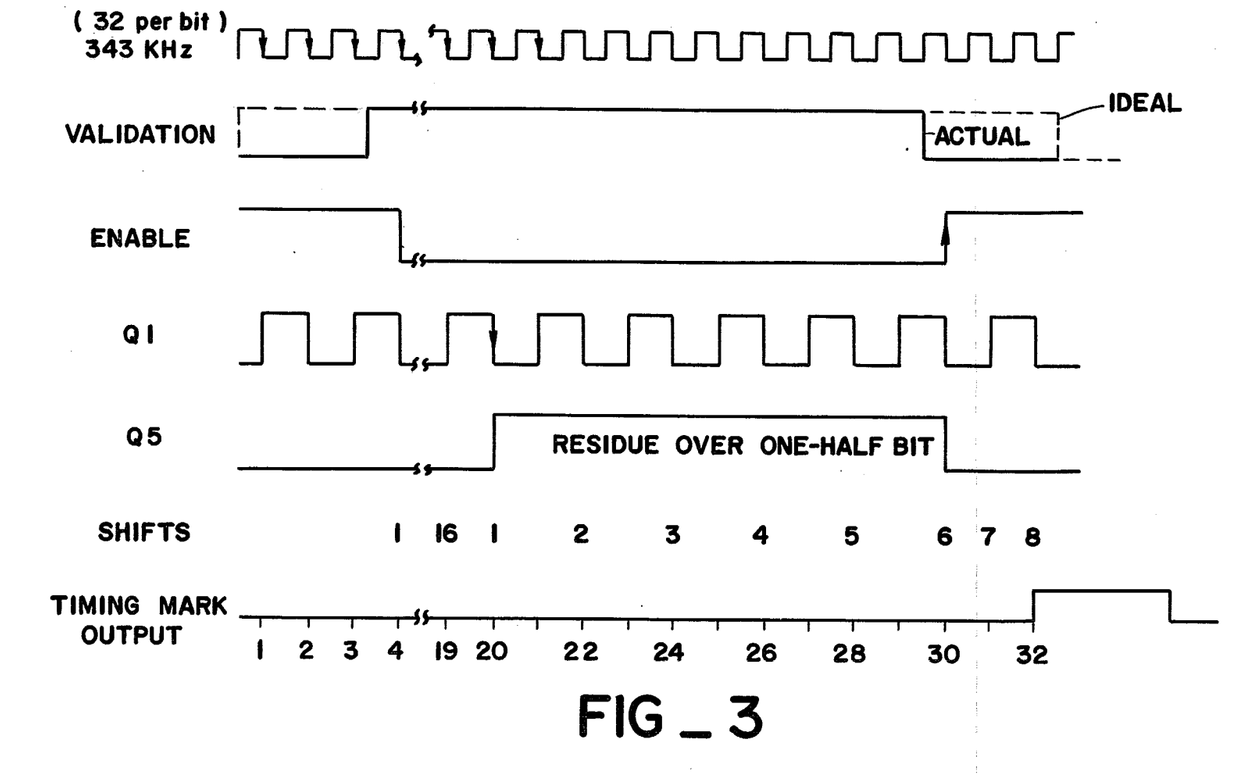
FIG. 3 is a timing diagram for one channel of the Doppler compensated PSK signal processor of FIG. 2.

Ideally the VALIDATION signal is one data bit long. Practically it is something less than one data bit long, but should be longer than one-half data bit long. Therefore, the ideal end of the VALIDATION signal is desired to give a timing mark at the end of the ID code data bits to provide an accurate time for tracking with respect to $I_o$. A flip-flop 116 accepts the VALIDATION signal and the 343 kHz Doppler compensated VCO clock and outputs for each clock cycle a mirror of the VALIDATION signal, i.e., when VALIDATION goes high $\overline{Q}$ will be low at the next clock cycle, and when VALIDATION goes low $\overline{Q}$ will be high at the next clock cycle. A validation counter 118 is enabled by the output of the flip-flop 116 when the VALIDATION signal occurs and then counts the cycles of the 343 kHz clock for the period equal to one-half of a data bit or 46⅔ μsec (16 cycles). At 46⅔ μsec Q5 goes high, enabling NAND gate 120 and disabling NAND gate 122. NAND gate 124 provides clock pulses to a timing mark shift register 126. When Q5 is low, the 343 kHz signal clocks the timing mark shift register 126 with zeros from Q5. When Q5 is high, the 343 kHz signal is divided by two at Q1 and the timing mark shift register 126 is clocked with ones at one-half the rate. The output of the timing mark shift register 126 goes high when the ones have shifted eight places, generating the leading edge of the TIMING MARK at the end of the ideal VALIDATION signal. See FIG. 3 for the timing involved.

A timing mark latch 128 (FIG. 2f) is clocked by a high frequency external clock, such as 2.5 MHz as illustrated. A time counter 130 is reset to zero by the standard range clock at time $I_o$, the time to which the vehicle 10 is also synchronized and at which the data message was transmitted. The time counter 130 then counts pulses of the 2.5 MHz clock until the timing mark occurs. A time counter latch 132 is enabled at the timing mark time and transfers the data from the output of the timing counter 130 to the output of the timing counter latch from whence it is transferred via the microprocessor 48 to the data processor 52 upon a software interrupt command BYTES 1–3.

If the noise level as detected by quality comparators 98 and 100 is too high (>15 dB) or two low (<-25 dB), a FAULT (FIG. 2c) is indicated to notify the data processor 52 of a system malfunction. If the signal-to-noise ratio is between 5 dB and 10 dB (a marginal signal) or greater than 18 dB, a S/N B flag is set. If the signal-to-noise ratio is greater than 10 dB, a S/N A flag is set. When the signal-to-noise ratio is greater than 18 dB, the cross-talk inhibit circuit 37 pulls down the line at point 134 where all four channels x, y, z and c are tied together. Since the signal-to-noise ratio for all channels should be approximately the same, an INHIBIT signal will be generated unless the signal-to-noise ratio for the particular channel is greater than 10 dB. The INHIBIT is applied to the priority encoder 114 (FIG. 2e), preventing the generation of a VALIDATION signal and thus the TIMING MARK. After a VALIDATION signal has been received and a TIMING MARK generated, a flip-flop 136 (FIG. 2c) is set to generate an INHIBIT until the microprocessor 48 has completed reading the data (BYTES 0–7) generated by that message. Also, software commands from the microprocessor 48 can create the crosstalk or inhibit situations.

The threshold levels which are used by the threshold comparators 112 are generated by a plurality of threshold gates 138. Four inputs from a voltage divider network (not shown) correspond to predetermined correlation levels, for example 15,16,17 or 19 out of 19 bits. The particular level is determined by a software command at inputs A and B of the threshold gates. For those codes which have exceptionally low cross-correlation and are considered more important, the window generator 38 reduces the threshold level further to provide greater acquisition probability, at the expense of some spurious data, of data that may be distorted due to multipath or poor fidelity acoustic projectors 18.

When SIG IN is received and the signal-to-noise ratio is determined, if the S/N is greater than 10 dB, a load flip-flop 140 has a "1" at its D input and at the next 343 kHz clock cycle Q goes high, loading a serial three-stage counter 142 with a pre-set value. The third stage of the counter 142 has a Q3 high after the load which is input to its own enable line and to the D input of an enable flip-flop 144, clocking $\overline{Q}$ to low at the next 343 kHz clock cycle to enable via NAND gate 146 the first two stages of counter 142. The counter 142 counts the 343 kHz cycles at 32 cycles per data bit until Q3 of the third stage goes low, disabling the third stage and setting one input of NAND gate 146 high. If $\overline{Q}$ of the flip-flop 144 is high and Q4 of the second stage of the counter 142 is low, a lowered threshold signal appears at OR gates 148 if enabled by a dynamic threshold command (DYN CMD) from the microprocessor 48. The output of the OR gates 148 provides a binary "11" signal to the A B control lines of one or more of the threshold gates 138. For the given illustration the threshold levels may be set by the following Table:

| Threshold Level | Binary Command A B |
|---|---|
| +18 ½ | 0 0 |
| +16 ½ | 0 1 |
| +15 ½ | 1 0 |
| +14 ½ | 1 1 |

The command from the window generator 38 sets the appropriate threshold gates 138 to the lowest threshold level so that 15 or more out of 19 comparisons will generate a VALIDATION pulse. All the threshold gates 138 are also subject to threshold commands from the microprocessor 48.

Figure 4:
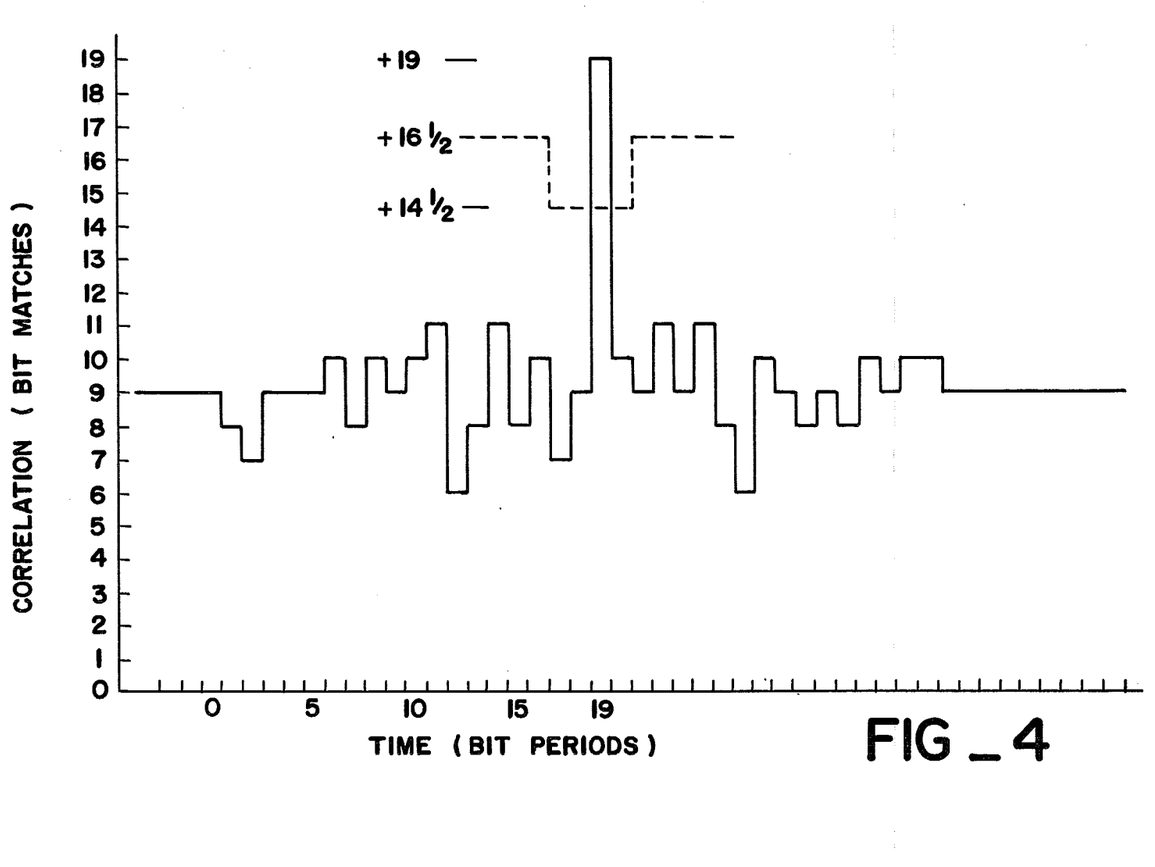
FIG. 4 is a graph of correlation in bits versus time in bit periods.

With the third stage disabled the first two stages of the counter 142 continue to count until Q4 of the second stage goes high, at which point the stages are also disabled via NAND gate 146 and the threshold window terminates. FIG. 4 shows a threshold level set by the microprocessor threshold command which requires 17 out of 19 bits of correlation for a validation pulse. Just prior to the 19th bit, actually the 18th bit discounting the first reference bit, the window generator 38 commands minimum threshold. At the expiration of the threshold window the threshold level returns to the microprocessor commanded level. The preset number for the counter 142 allows for the length of the acquisition tone or the data delay in delay line 90.

Figure 2F:
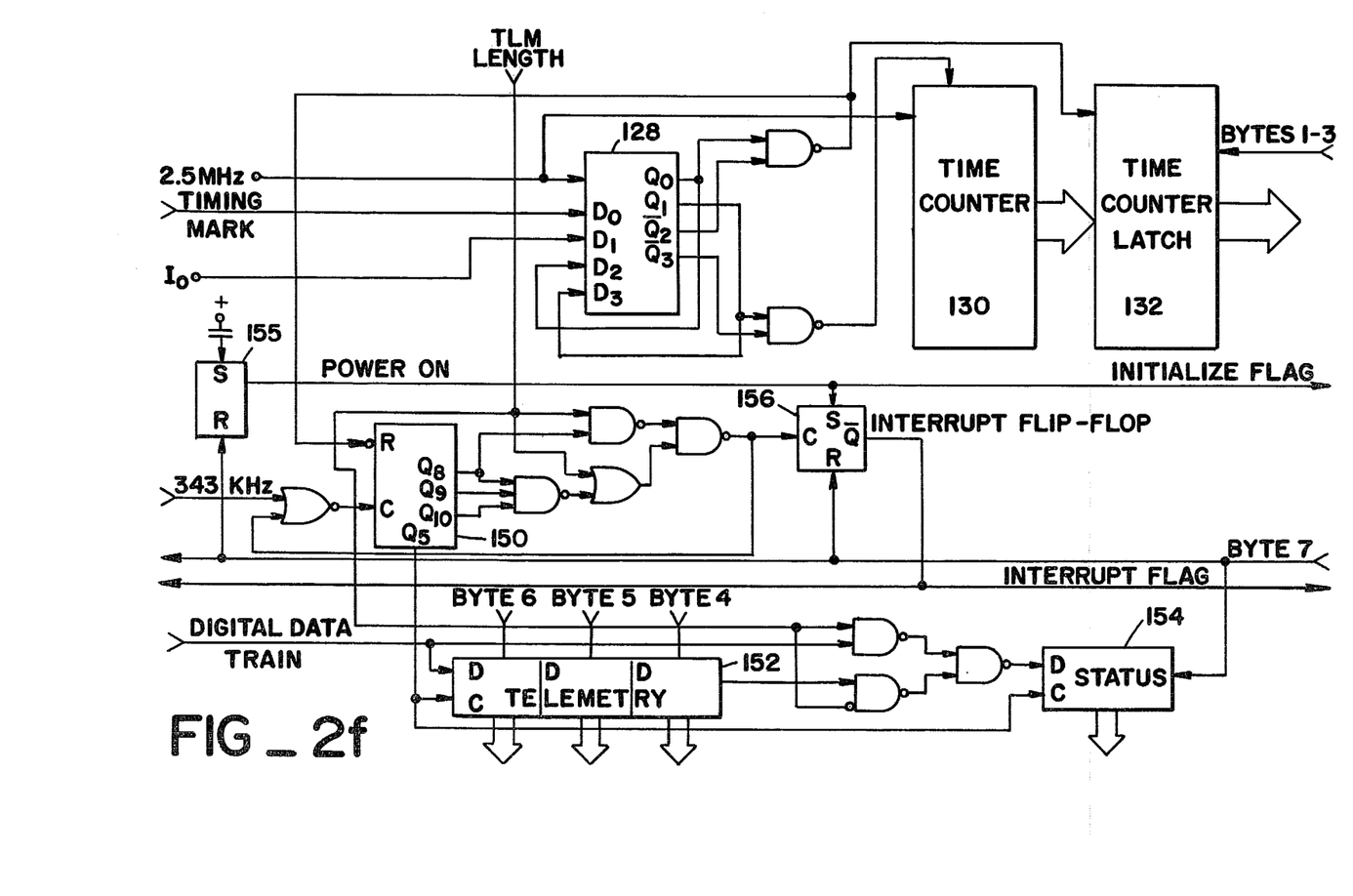

After the VERIFICATION has been checked and the time established, the remaining portion of the data message is taken up with status and telemetry information (FIG. 2f). The microprocessor 48 for this illustration commands the TLM LENGTH either high or low depending upon whether only the status bits are to be processed or whether the complete telemetry portion is to be processed. The transfer pulse produced by the TIMING MARK which transfers the time from the time counter 130 to the time counter latch 132 also resets a telemetry counter 150. The reset of the counter 150 also enables the counter to count the 343 kHz pulses. Every 32nd pulse, i.e., every data bit, Q5 of the counter 150 provides a clock pulse to a telemetry shift register 152 and a status shift register 154, the first such clock pulse occurring after 16 343 kHz pulses, i.e., in the middle of the first status data bit.

The DIGITAL DATA TRAIN which now has only status and telmetry bits remaining is applied to the D input of the telemetry shift register 152 and shifted right for each bit clock pulse from the telemetry counter 150. If TLM LENGTH is high, the DIGITAL DATA TRAIN is also input to the status shift register 154. After 4 bits with TLM LENGTH high Q8 of the telemetry counter 150 goes high and an interrupt flip-flop 156 is clocked to generate an INTERRUPT FLAG at its $\overline{Q}$ output. Power on or circuit board removal and replacement sets the initialize flip-flop 155 and generates the INITIALIZE FLAG to notify the microprocessor 48 that the particular channel is ready for initialization. The BYTE 7 READ command, the final read command from the microprocessor 48, resets the interrupt flip-flop 156 and initializes flip-flop 155 and removes the INTERRUPT and INITIALIZE FLAGS.

For TLM LENGTH low the DIGITAL DATA TRAIN is applied only to the telemetry shift register, which is read by BYTES 4-6 from the microprocessor 48. The output of the telemetry shift register 152 is input to the status shift register 154 so that when the count of the telemetry counter is 28 data bits the interrupt flip-flop 156 is clocked and the status data bits are in the status shift register. The bit count which clocks the interrupt flip-flop 156 also inhibits further counting by the telemetry counter 150 and the data in the telemetry and status shift registers 152,154 is ready to be read out by the microprocessor 48 by the appropriate commands.

Figure 5A:
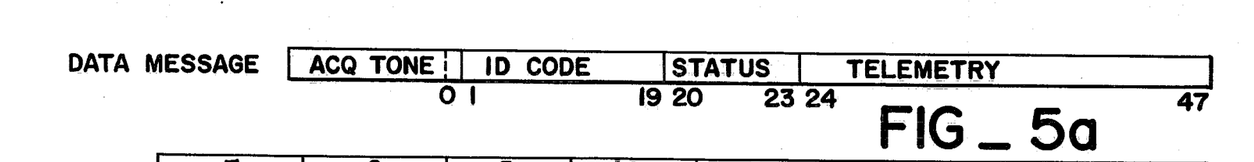
Figure 5B:
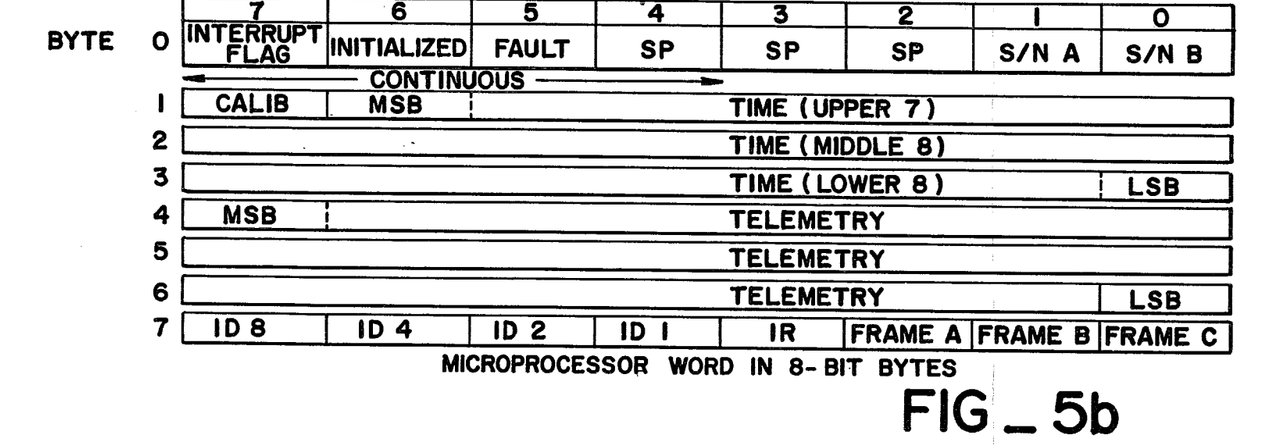

FIG. 5a shows a typical data message with an optional acquisition tone for Doppler compensation lock-on without internal data delay. The last 24 bits of telemetry data are also optional if not desired. After processing by the PSK signal processor 28 the microprocessor 48 has stored the word indicated read out by the appropriate BYTE commands. FIG. 5b details the format of the eight-byte word.

Figure 5C:
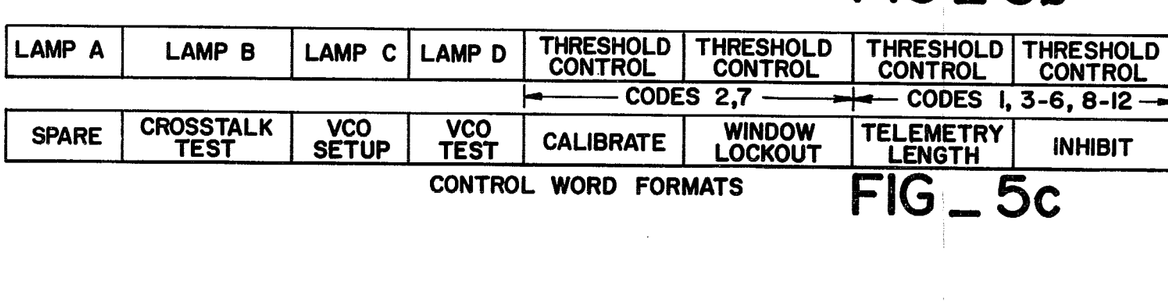

The microprocessor 48 can control various test and operational functions in the PSK signal processor 28. FIG. 5c details the format of the two-byte control word that can be sent to the PSK signal processor 28.

Each channel c, x, y, z is connected to the same microprocessor 48 and read on an interrupt basis. Each channel may be removed and replaced, with the power on generating an INTERRUPT FLAG to the microprocessor 48 to take control. The data from the four channels is then transferred to the data processor 52 for analysis and display in real time as well as for postoperation analysis.

Thus, the present invention provides a PSK signal processor for acoustic data messages which compensates for Doppler phase shifts to provide very accurate tracking information as well as providing the ability to pass on telemetry data and identify the transmitting vehicle.

What is claimed is:

1. A Doppler compensated PSK signal processor for underwater acoustic telemetry messages having an identity code portion and a status and telemetry portion, said messages being transmitted from a plurality of vehicles moving relative to a sensor array and to each other, comprising means for processing independently said telemetry message received by each sensor of said sensor array, said processing means for each sensor comprising:

(a) means for generating a plurality of timing signals from said received telemetry message, said timing signals tracking the carrier frequency of said received telemetry message to compensate for Doppler frequency shifts due to the movement of the particular transmitting vehicle relative to said sensor array; and (b) means for validating said received telemetry message and generating a timing mark upon recognition of a valid identity code for said particular transmitting vehicle, said validating and generating means being Doppler compensated by said timing signals, and said timing mark establishing a time which is a function of the range of said particular transmitting vehicle from said sensor.

2. A Doppler compensated PSK signal processor as recited in claim 1 wherein said generating means for timing signals comprises:

(a) means for constructing an intermediate carrier frequency from said received telemetry message, said intermediate carrier frequency varying from a nominal intermediate frequency due to Doppler phase shifting;

(b) a reference voltage controlled oscillator having a nominal output frequency, said reference voltage controlled oscillator producing said timing signals;

(c) means for converting said intermediate carrier frequency and said nominal intermediate frequency derived from said nominal output frequency to voltage levels, said voltage levels being a function of the respective frequencies; and (d) means for comparing said voltage levels to produce an error signal, said error signal being applied to said reference voltage controlled oscillator so that said nominal output frequency tracks said intermediate carrier frequency, reducing said error signal to zero.

3. A Doppler compensated PSK signal processor as recited in claim 2 wherein said validating and generating means comprises:

(a) a differential detector to which is input said received telemetry message, said differential detector being controlled by said timing signals to detect the phase shifts between data bits in said received telemetry message;

(b) a correlator to which is input said detected phase shifts under the control of said timing signals, said correlator comparing said identity code portion of said received telemetry message with a plurality of valid identity codes;

(c) a threshold circuit to generate a validation pulse when the correlator comparison exceeds a predetermined threshold value, and to identify which of said identity codes generated said validation pulse; and (d) means for determining said timing mark from said validation pulse.

4. A Doppler compensated PSK signal processor as recited in claim 3 further comprising means for determining a signal strength for said received telemetry message.

5. A Doppler compensated PSK signal processor as recited in claim 4 further comprising means for reducing said predetermined threshold value when said signal strength exceeds a first predetermined signal-to-noise ratio.

6. A Doppler compensated PSK signal processor as recited in claim 5 further comprising means for inhibiting said validation pulse when said signal strength exceeds a second predetermined signal-to-noise ratio for one of the other sensors of said sensor array and said signal strength does not exceed said first predetermined signal-to-noise ratio for the particular sensor being processed.

7. A Doppler compensated PSK signal processor as recited in claim 6 further comprising means for separating said status and telemetry portion of said received telemetry message from said identity code portion under the control of said timing signals.

8. A Doppler compensated PSK signal processor as recited in claim 7 further comprising:

(a) means for communicating said status and telemetry portion, said identity code and said time established by said timing mark to a microprocessor for further data processing; and (b) means for receiving commands from said microprocessor.

9. A Doppler compensated PSK signal processor as recited in claim 8 wherein said converting means comprises:

(a) means for amplifying the percent Doppler shift of said intermediate carrier frequency from said nominal intermediate frequency by mixing with a common reference frequency;

(b) means for amplifying and clipping both said mixed intermediate carrier frequency and said mixed nominal intermediate frequency;

(c) means for converting said amplified and clipped mixed intermediate carrier frequency and mixed nominal intermediate frequency into pulses;

(d) means for counting a predetermined number of cycles of an external fixed frequency source between each successive pulse for said mixed intermediate carrier frequency and for said mixed nominal intermediate frequency, the output of said counting means being at a first voltage level when said pulse is received until said predetermined number of cycles is counted, said output then switching to a second voltage level; and (e) means for averaging said first and second voltage levels for said mixed intermediate carrier frequency and for said mixed nominal intermediate frequency to produce said intermediate carrier frequency voltage level and said nominal intermediate frequency voltage level for input to said comparing means.

10. A Doppler compensated PSK signal processor as recited in claim 9 wherein said differential detector comprises means for comparing each data bit of said received telemetry message with the subsequent data bit, said data bit comparing means outputting a pulse when said data bits are out of phase to produce a digital data train.

11. A Doppler compensated PSK signal processor as recited in claim 10 further comprising means for calculating the noise range and signal-to-noise ratio range of said received telemetry message.

12. A Doppler compensated PSK signal processor as recited in claim 11 wherein said reducing means comprises:

(a) means for counting the data bits of said received telemetry message when the signal strength exceeds said first predetermined signal-to-noise ratio;

(b) means for generating a threshold command to reduce said predetermined threshold value prior to the last data bit of said identity code portion of said received telemetry message; and (c) a threshold gate which inputs threshold levels to said threshold circuit, said threshold gate reducing selected threshold levels to said threshold circuit upon receiving said threshold command.

13. A Doppler compensated PSK signal processor as recited in claim 12 wherein said correlator comprises:

(a) a high resolution shift register with a number of taps equal to the number of data bits in said identity code portion of said received telemetry message; and (b) a plurality of summing circuits, one for each of said valid identity codes, each of said summing circuits being connected to each data bit output of said shift register and to the input data bit to said shift register through inverting or non-inverting buffers according to the particular valid identity code for that summing circuit.

14. A Doppler compensated PSK signal processor as recited in claim 13 wherein said threshold circuit comprises:

(a) a plurality of threshold comparators, one for each of said valid identity codes, each of said threshold comparators having one input connected to one of said summing circuits and a second input from said threshold gate; and (b) means for converting the output from one of said threshold comparators which exceeds the threshold level from said threshold gate into said validation pulse and an identity code number for the particular valid identity code of said received telemetry message.

15. A Doppler compensated PSK signal processor as recited in claim 14 wherein said timing mark generating means comprises:

(a) a timing mark shift register;

(b) means for counting one of said timing signals for one-half of an ideal validation pulsewidth; and (c) means for shifting a timing mark pulse through said timing mark shift register at one-half rate of said one of said timing signals for the period that the pulsewidth of said validation pulse exceeds one-half of said nominal validation pulsewidth and at normal rate subsequently such that said timing mark arrives at the output of said timing mark shift register at the end of said ideal validation pulsewidth.

16. A Doppler compensated PSK signal processor as recited in claim 15 further comprising means for counting up a fixed enternal clock from an initial time synchronized with the transmission time of said received telemetry message until said timing mark is generated, the count of said counting up means corresponding to said time established by said timing mark.

17. A Doppler compensated PSK signal processor as recited in claim 16 wherein said separating means comprises:

(a) a telemetry counter which is inhibited until said timing mark occurs, said telemetry counter counting said one of said timing signals and outputting a clock at the data bit rate of said received telemetry message; and (b) a telemetry shift register to which said digital data train is input by said clock from said telemetry counter.

* * * * *